July 7, 1931.  W. T. BIRDSALL  1,813,226
METHOD OF AND APPARATUS FOR RENDERING FATS
Filed Nov. 20, 1924  3 Sheets-Sheet 2

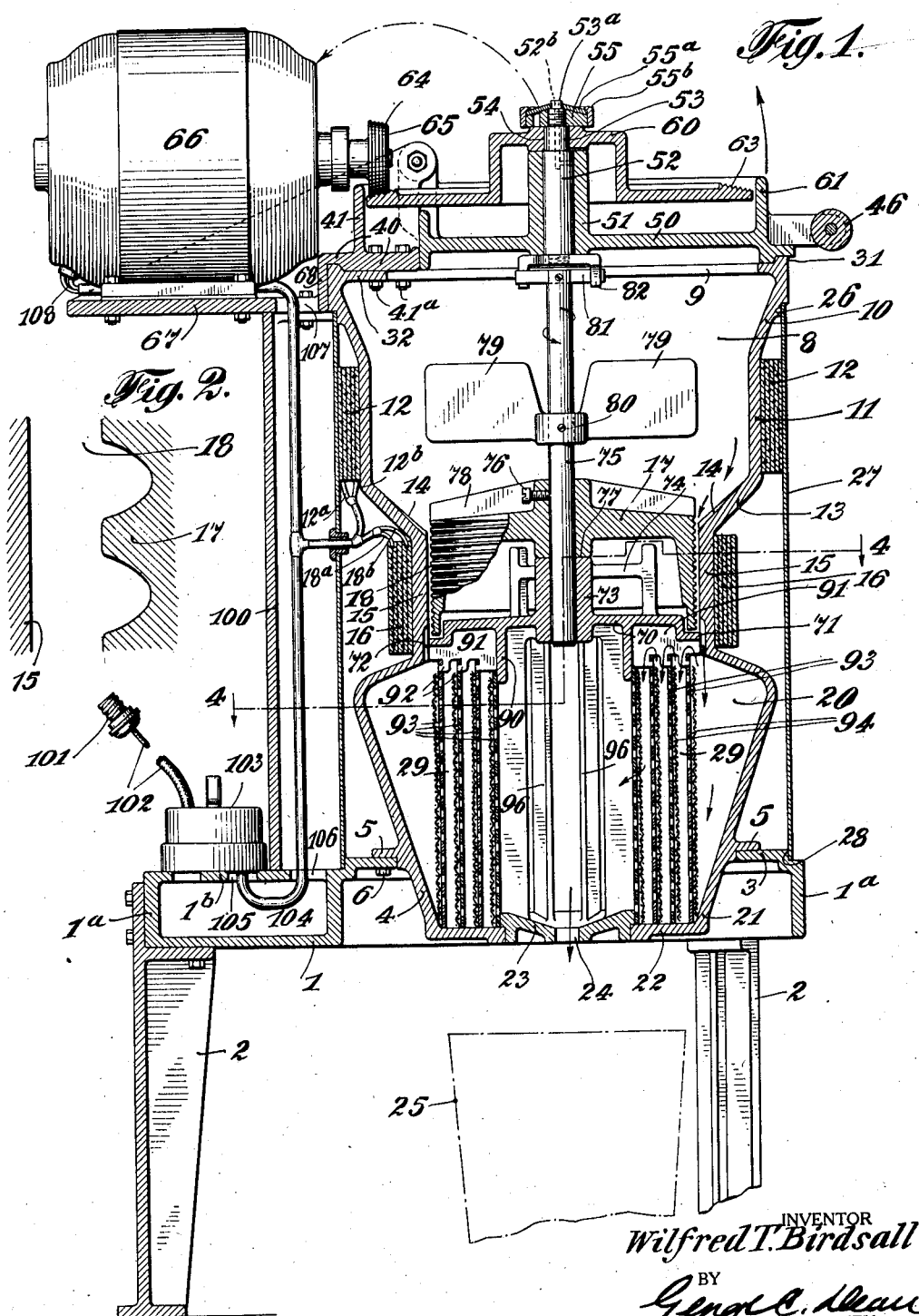

INVENTOR
Wilfred T. Birdsall
BY
George C. Alcorn
his ATTORNEY

July 7, 1931.  W. T. BIRDSALL  1,813,226
METHOD OF AND APPARATUS FOR RENDERING FATS
Filed Nov. 20, 1924   3 Sheets-Sheet 3
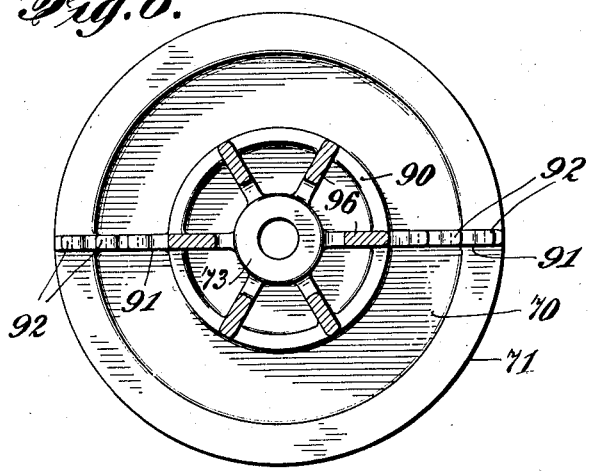
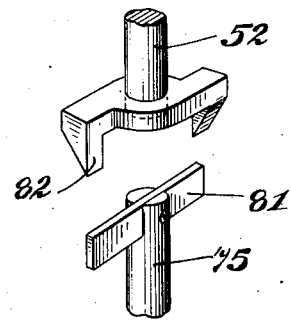
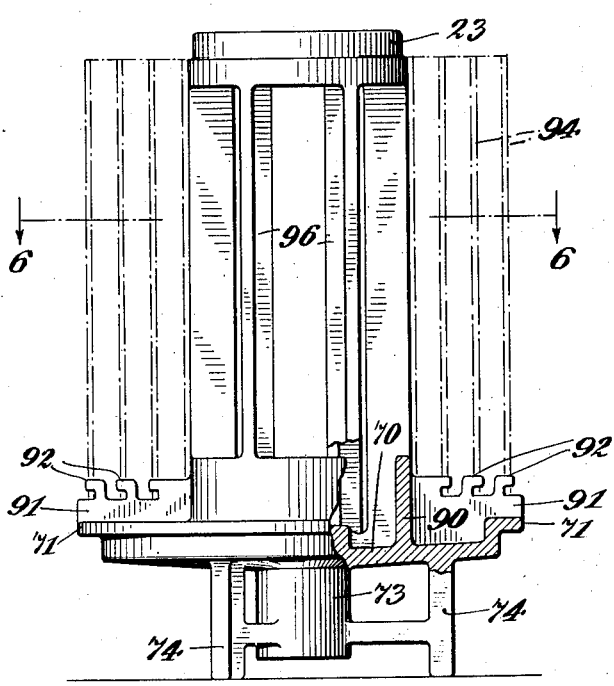
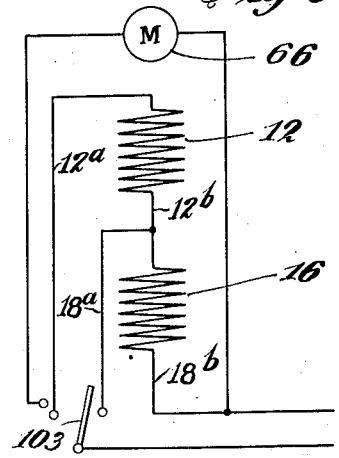
INVENTOR
Wilfred T. Birdsall
BY
his ATTORNEY Patented July 7, 1931

1,813,226

UNITED STATES PATENT OFFICE

WILFRED T. BIRDSALL, OF MONTCLAIR, NEW JERSEY, ASSIGNOR TO B. B. MACHINE CORPORATION, A CORPORATION OF NEW YORK

METHOD OF AND APPARATUS FOR RENDERING FATS

Application filed November 20, 1924. Serial No. 751,002.

My present method is shown as embodied in a machine particularly adapted for use in butcher shops, more or less intermittently, and on a relatively small scale; but as the method of rendering, as well as the apparatus for performing the method, are entirely novel, it is evident that apparatus embodying the same principles can be advantageously employed in ordinary commercial rendering plants, for continuous operation on large quantities of fat, in lieu of the methods now employed.

Heretofore it has been impracticable for the average retail meat seller to render his own fat-scrap because his available methods have been troublesome and faulty, resulting in a product in which the fatty acids may run up to between 1% and 5%, whereas even 1% is objectionable. By my invention every little butcher shop may be supplied with superior means for rendering fats while they are fresh, and in such a way the product will be practically free from fatty acids and other effects of oxidation or decomposition. There is practically no oxidation or acid production during the rendering, and in fact, even the fraction of one per cent. normally found in fresh undecomposed fat, may be decreased. It results that the butcher who now sells his fats at a very low price per pound will be able to run them through my machine for a fraction of a cent per pound and thereby make 85% to 90% of it into a wholesome, edible product, salable at five or ten times the price he now gets for his fat, while the 10% or 15% pulp residue will be salable at about the same price per pound that he now gets for the fat.

My process is an entirely new technical development, involving a continuous operation whereby the fat is rendered, sterilized and filtered in less than a minute at a temperature substantially below the boiling point of water. This is particularly remarkable in view of the fact that the specific heat absorbed by the fat in warming up to melting temperature and the latent heat absorbed by the melting, are both very large; while the thermal conductivity of the material is very poor, and the heat applying surfaces in contact with the fat are kept substantially below 212° F. in order to avoid steaming, burning and other effects tending to spoil the product. Even when the fatty content has been rendered fluid, it is contained in cells of connective tissue which holds it in place as an insulating film or coating through which the heat must penetrate in order to reach and melt the next adjacent layer or film of the fat.

Because of the above difficulties, it has become established practice first, to cut the fat in very small pieces; second, to stir it; and third, to leave the liquefied fat in the vessel to act as a heat carrying medium for the unmelted fat, until all has been melted. It is almost impossible to get commercial results if the liquid is drawn off as fast as melted. On the other hand, subjecting the melted part of the fat to so high a temperature for the long time required to melt the whole of it, greatly impairs its quality as an edible product. In a particular case, it was found that with a kettle full of fat, about one foot in diameter, with its walls kept continuously at a temperature of 212° F., it required many hours to melt the mass when the hot melted fluid was allowed to run off, instead of being stirred into the interior of the mass. In another case, a mass of fat in the kettle was subjected to the same temperature, without drawing off the melting fat. Under these conditions, the thin outer layer in actual contact with the hot walls, quickly becomes translucent but this layer remains structurally solid because the melted fat is held in minute cells of non-melted connective tissue, and even if the heating is continued several hours, the thickness of this layer will not increase more than three or four inches and all the central portion will remain a white, unaffected mass.

My present method depends upon the first of the above described easily demonstrable facts, namely, the fact that an extreme outside film of a mass of fat can be melted to the translucent condition in a very few seconds; and it involves a further discovery that large masses of fat can be quickly rendered if the minute cells of the connective tissue are broken down and the fat allowed to run off as fast as it melts. I find that as soon as the oil melts, the retaining cells and fibers of connective tissue being no longer structurally supported by solid fat, can be readily and in great degree selectively broken down and the melted oil drained off in accordance with my present method, thereby exposing fresh untreated surfaces of the fat directly to the heat, without any intervening layer of connective tissue and melted oil held thereby. By this method, a piece of fat one inch in thickness can be melted in less than a minute, by contact with a surface at 212° F. Without such mechanical disintegrating or abrasive action, the same piece of fat will require over an hour merely to melt its oil content to the translucent condition and even then the connective tissue will hold it in a coherent mass of approximately the original size and shape.

My method contemplates the use of closely adjacent heated surfaces between which the fat is forced in a thin film, not as when the fat is merely compressed between hot rolls, but rather in such a way as to ensure breaking up the connective tissue as fast as the films are melted to translucent condition. To this end I prefer heating surfaces which have a mechanically disintegrating effect, preferably a mascerating or kneading effect as well as an abrasive effect. Preferably, these effects are attained by causing cooperating surfaces that engage the film to have differential speeds or feeding effects as by having one of them stationary and the other moving. Most movements tending to produce a rolling effect will be found to have a desired mascerating kneading and abrasive effect when applied to ordinary fat, but I prefer a non-positive screw feed effect. Preferably, the surfaces are concentric, one, preferably the outer one, being stationary, while the other rotates. Preferably, the stationary surface is heated and the moving surface is so close that in practical operation it is kept well above the melting temperature of the fat, even though it may be substantially cooler than the surface through which the primary heat is derived.

In the preferred embodiment of my method, the rate of heat application to the surfaces is predetermined with reference to the cooling effect of the fat and this depends on the rate of feed of the fat therethrough and the heat units required to melt it. While the rate of melting tends to automatically govern the rate of feed by varying viscosity and friction, I prefer to employ a screw groove on one member cooperating with a friction surface on the other member, tending to non-positively roll very small balls or cylinders of the fibrous fat through the pass at a fairly definite rate such that the surfaces will not get hotter than the boiling point of water. Consequently, no water is boiled off and in practice it is found that all the water and even some of the fatty acids remain with the pulp and are filtered out with it at the exit end of the machine. This further reduces the time and temperature of the heating and is a great improvement over all prior processes wherein water comes off with the fat and has to be separated by a subsequent boiling because if an appreciable fraction of 1% remains in the product, it becomes rancid very easily.

I find that satisfactory feed of the fat may be had with a cylindrical rotor about 7 inches in diameter, having screw grooves, about ten to the inch, about one-fortieth inch apart and about one twenty-fifth of an inch deep, the clearance between rotor and surrounding stationary surface being about one-sixteenth inch or less. In normal operation at 212° F. and 225 R. P. M., this will feed the fat at about one-half the rate it would travel if the screw were forcing it through positively without slip. This and the tendency to pellet formation found in the fibrous pulp residue indicate that the fat is fed through the pass by a rolling, non-positive squeezing and abrasive action. This would account for the completeness of the rendering that can be effected in less than one minute while the pulp is being fed through a pass which, measured axially, is only about 2½ inches long.

The filter into which the fat and pulp pass, is so remote from the heater that water will not be driven off of the pulp into melted fat during the filtering and if improper operation causes steaming in the upper part of the machine, condensate therefrom cannot reach the filter cloth until it has become waterproof by saturation with the melted fat.

The machine herein illustrated is extremely simple, comprising an upper hopper for containing and preferably preheating a supply of the fat; an intermediate heated barrel; a rotor, concentric with the barrel and preferably having some form of screw thread tending to advance the fat axially at a predetermined rate, and a lower filter comparatively near but relatively much cooler than the fat melting surfaces. Other features include providing a simple form of electric motor drive with an automatic clutch connection and electrical heating means to preheat the hopper and to maintain heat on the melting surfaces, all designed for use on an ordinary household electric circuit. All parts, including the filters, are easily accessible and can be taken apart for cleaning or renewal in a very few minutes and without any special tools.

The above and other features of my invention may be more fully understood, from the following detailed description in connection with the accompanying drawings, in which Fig. 1 is a vertical axial section through the entire machine;

Fig. 2 is a detailed view on a large scale, showing the means for feeding the fat through the pass between the heated surfaces;

Fig. 5 is a detailed view, partly in section, showing the filter;

Fig. 6 is a horizontal section on the line 6—6, Fig. 5;

Fig. 7 is a detailed perspective view of the clutch connection between the motor drive and the rotor; and Fig. 8 is a diagram of the heating and motor circuits.

Figure 3:
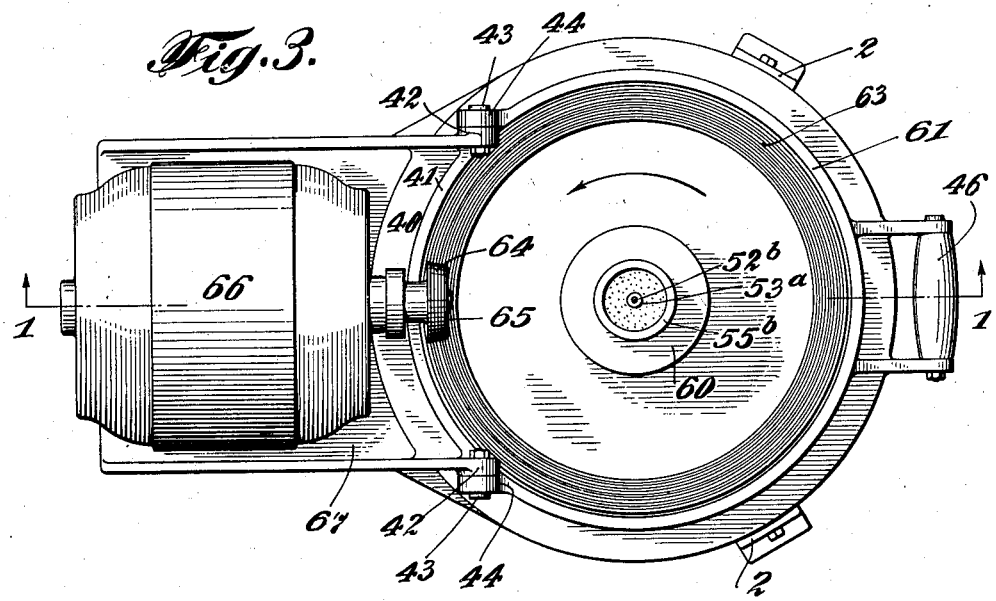
Fig. 3 is a top plan view of the machine.
Figure 4:
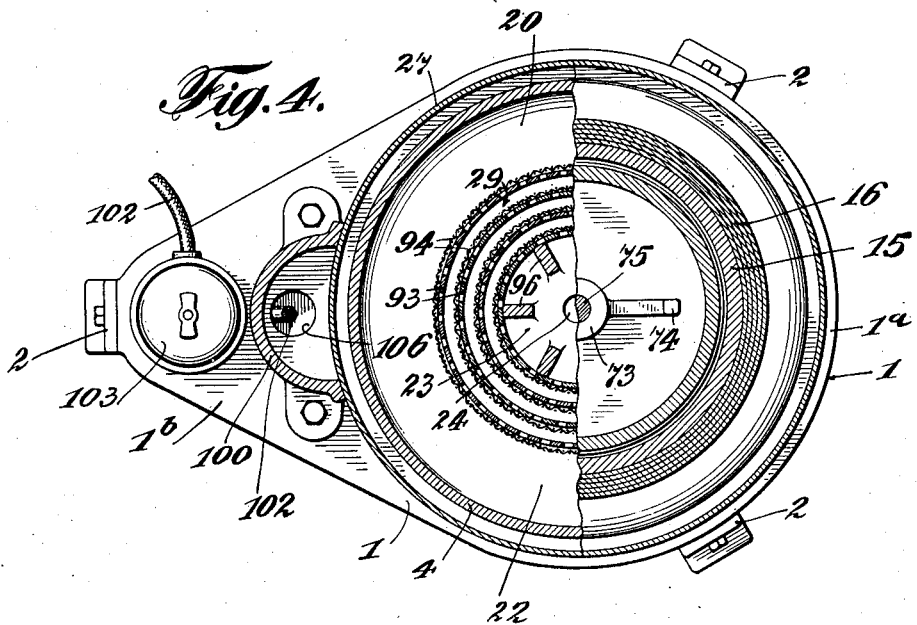
Fig. 4 is a horizontal section on the line 4—4, Fig. 1.

As shown in these drawings, there is a horizontal platform member 1, supported on legs 2 having an annular flange portion 3 supporting a circular opening in which projects the lower portion 4 of an upright tubular casting which is preferably cylindrical in cross-section, having an integral flange 5 engaging the upper surface of flange 3 and secured thereto by bolts 6. This upright tubular member is preferably a casting of a suitable aluminum alloy which is light in weight and is a good conductor of heat. The upper end of this constitutes a hopper 8, into which a quantity of the chopped fat may be charged through the upper opening 9. From the open end downward, the hopper converges for a certain distance, as at 10, the converging portion curving into a cylindrical portion 11, surrounded by electrical heating coils 12 for preheating the material in the hopper. Below this body portion of the hopper is a further converging portion 13, preferably provided with ribs 14 leading to the cylindrical barrel portion 15 the outside of which carries the main electrical heater coil 16 and the inner surface of which affords the stationary heated, fat-rendering surface which cooperates with the outer surface of the rotor 17 to form an annular cylindrical path 18 through which the fat is fed and rendered as above described. Below the barrel portion 15, the tubular body member widens broadly to afford an annular reservoir space 20, into which the pulp and melted oil are discharged in operative relation to the cylindrical filter elements 29, 29. This reservoir space converges downward so that its bottom portion 21 is approximately the same diameter as the outermost of the cylindrical filter elements. The bottom 22 has a large circular opening closed by removable member 23 which has a smaller central opening 24 through which the filtered fat may be drained to the pail or other receptacle 25.

The upper maximum diameter portion of this upright tubular member is provided with an annular seat at 26, affording a bearing for a cylindrical outer casing 27, the lower end of which has similar bearing in an anular seat formed at 28 in the flat form casting 1. This exterior cylinder may be formed of or covered with heat insulating material. It affords a heat insulating interspace filled with air or insulating material for confining heat which naturally conducts through and tends to radiate from the above described tubular casting. The upper opening into the hopper is formed with an upstanding guide flange 31 and a horizontal annular flange 32, fitted with a suitable closure. A segment of the flange is engaged by a fixed cover portion segmental casting comprising a horizontally extending clamp member 40, an upstanding cylindrical segment 41 and parallel end brackets 42 having axially aligned openings for pivots 43 on which are hinged parallel ears 44 of a hinged cover section adapted to closely fit the portion of the opening not covered by segmental castings 40, 41. The free edge of the cover has a handle 46. Bolts 41a rigidly secure the horizontal segment 40 to toe flange 32.

By reference to Fig. 1, it will be seen that the hinged cover comprises a disk portion 50 having an upstanding cylindrical boss 51 providing a bearing for drive shaft 52 having a reduced portion 53, to which a driving pulley 60 is rigidly secured by key 54 and nut 55. The cover is also formed with an upstanding cylindrical flange 61 affording, with the fixed segment 41, a cylindrical guard for the periphery of the drive wheel 60.

The upper face of the drive wheel has a slightly beveled friction gear surface 63, preferably formed with concentric annular grooves normally engaged by the periphery 64 of a pulley 65, preferably of leather treated with non-slip composition and mounted directly on the shaft of motor 66. Preferably, this motor is bolted to a bracket 67 formed integral with a flange 68 depending from the horizontal member 40.

Within the above described body portion of the machine, and near the lower end of the barrel 15 is a horizontal diaphragm member 70 having its periphery at 71 closely fitting the interior of barrel 15, so that it closes the lower end thereof, outlets for downflow of fat and pulp being provided in the form of grooves 72 on the inner surface of the barrel.

The lower face of the diaphragm 70 is formed with a depending annular member 90 and radial members 91, the latter being provided with hook like projections 92, adapted to engage reticulated metal cylinders 93 having filter fabric 94 secured over the outer faces, so that they are supported thereby against the thrust of liquid and pulp, discharged into the space 20. The above described parts are supported on radial partitions 96, 96, which are preferably cast integral with the lower closing member 23 described above. See Fig. 5

The upper face of this diaphragm member 70 is formed with a central boss 73, the upper end of which is seated by radial casting 74. This boss affords a central step bearing for shaft 75, having the rotor 17 rigidly secured thereto as by lock screw 76. The lower face 77 of rotor 17 sustains the end thrust due to the weight of the shaft and also due to the weight of the fat in the hopper which rests on the upper face of the rotor. Said upper face has radial vanes or fins 78 adapted to engage the lower portion of the mass of fat and rotate the same, thereby giving it a centrifugal tendency toward the converging portions 13 of the hopper. There is a further rotating and stirring produced by the vanes 79 secured to the shaft 75 as by lock screw 80.

At the upper end of shaft 75 are radial arms 81 engaging downwardly projecting dogs 82 rigidly secured on the lower end of the above described shaft 52, which is mounted in the cover. It will be noted that the arrangement of the radial drive lugs 81 and the cooperating dogs 82 affords a very effective, positive and open form of detachable coupling, as simple in its way as is the engagement and disengagement of the friction surface 63 of the drive wheel 60 from the leather pulley 65. Both automatically engage and disengage without interference whenever the cover 50 is lifted or lowered by means of the handle 46, regardless of whether the motor is running or not running.

Preferably, the platform 1 has a depending stiffening flange 1a and preferably also a rearward extension 1b having bolted thereto an upright semi-circular column 100 affording a solid brace for the platform 67 and also a backing for the upright body of the machine. Preferably, it is hollow and the hollow space is used for housing the conductors leading to the heaters 12, 16, and to the motor 66. The electrical connections may be through an ordinary plug 101 adapted to fit a lamp socket on a commercial lighting circuit. From the plug the flexible conductor 102 leads to a snap switch 103 on support 1b. From the switch the conductors in casing 104 extend downward through opening 105 and up through opening 106 into the interior of column 100, through which they pass upward by an opening 107, and thence to the motor, as indicated at 108. Preferably, the heaters 12 and 15 are supplied through conductors 12a, 12b and 18a, 18b, bridged across the supply conductors that lead to the motor. Preferably coils 12 and 16 are serially connected in one circuit with which the motor circuit is in parallel, both circuits being simultaneously closed by switch 103. For purposes of preheating the rendering surfaces 15, 18, however, prior to the introduction of fat into the hopper, the switch 103 is adapted upon reverse movement to short circuit the entire current through coil 16.

A useful detail is protecting the upper surface of nut 55 with a leather washer 55a, held by a flange collar 55b, which serves as a buffer to prevent damage when the cover is turned back and has its weight resting against the motor 66.

Another feature is extending a stud 53a up through the center of the washer and drilling therein an oil duct 52b leading downward and through a radial passage to supply oil between shaft 52 and its bearing 51.

Notable features of operation of the above apparatus in accordance with my method are as follows:

As explained above, maintaining the fat melting surfaces at temperatures below the boiling point of water requires coordinating the rate of heat supply, to the rate of conductivity of the material through which the heat is supplied and to the amount of the fat which is brought in contact with said surfaces per unit time. With a given normal charge of fat in the hopper 8, the activity with which fresh fat is brought into contact with the surfaces heated by heater 12 will depend on the speed of rotation of the paddles 79, and so far as concerns the heater 15, it will depend upon the speed, pitch and rate of feed of the screw threads of the rotor 17. These factors may vary widely. However, I find it to be a safe rule that the temperature of the resistance wires of the heaters may be, say, 500° F. and that with suitable insulation the inner contact surfaces can be made to heat to about 255° F. A rough test is that the surfaces when wetted may steam freely, thus indicating that they are well above 212° F., but will not sizzle, thus indicating that they are below 300° F. When starting cold, it will be found desirable to allow the apparatus to heat up to such temperatures before the fat is charged into the hopper. In operation, the heat absorption by the fat will cool the surface to below the boiling point of water.

Where the clearance between the barrel 15 and rotor 17 is about 1/16th of an inch, the threads about 10 to the inch, and the depth of the threads about 1/25th inch, as indicated in Fig. 2, a satisfactory speed for the rotor shaft 75 is about 225 revolutions per minute and the ratio of the driving gear 63 and driving pulley 65 is such that this requires a speed of about 1725 revolutions per minute for the motor 66.

The operation of the device will be evident from the above. The cover may be lifted at any time, thereby automatically disconnecting the drive gear and also the drive couplings 81, 82 and merely closing the cover again will reconnect the same. The finely chopped fat is thoroughly stirred because a central body thereof rests upon rotor 17 and is carried around by ribs 78 and blades 79, while an outer annulus resting against the side walls and upon the ribs 14 tends to be held against rotation. This, together with the centrifugal effect upon the rotating central portion, is effective for feeding the chopped fat to the outer annulus where it will be fed by gravity into range of the upper screw threads of the rotor 17. When once caught, the fat is forced through the pass 18 and, by reason of the non-positive rolling and squeezing action therein, all parts of it are presented in film contact relation with the heated surfaces, each portion of the fat requiring less than a minute to travel through the pass 18 and to be completely rendered by repeated and progressive film melting and film abrading operation of said surfaces. The pulp and oil pass downward through outlets 72 into annular space 20 and the oil filters through the four concentric filters 94 and flows through the outlet 24 into pail 25. In actual practice, the oil is found to be delivered into the pail at temperatures of 115° to about 155° F. When a run of fat has been completed, or the space 20 becomes filled with pulp, or the filter fabrics become clogged, the operative parts can be taken apart and cleaned by simply pivoting the cover to the open position, lifting out shaft 75 and rotor 17 and then lifting out the filter unit which may be turned upside down to rest upon the leg 74, as indicated in Fig. 5. This presents the filter cylinders in position for easy removal, cleansing or renewal. The barrel member being now empty, the interior thereof can be easily cleaned, all parts of the hopper being easily reached through the upper opening, and all parts of the filter chamber being easily reached through the lower opening. Re-assembly requires only replacing the filter unit, then replacing the rotor and shaft unit and then closing the cover.

Heretofore rendering machines in commercial use have been almost always batch machines, and the period between charging and final production of the edible product has required hours; the temperatures for much of this period have exceeded the boiling point of water, so that much of the water has been separated from the pulp along with the melted fat. The separation of the water has been by a separate hot process, usually by boiling it off. In my machine the first flow of the melted fat product from the lower outlet takes place in from ten to one hundred and twenty seconds after starting, depending on the filter construction and the initial temperatures of the apparatus. It is safe to say that in no case will the fat be in process more than a couple of minutes except that it may be delayed in the filter when the filter cloths become clogged, but such delay is negligible as compared with the hours required by all other methods.

In my apparatus only a very small fraction of the total water in the raw fat ever leaves its original place in the fibrous materials thereof. This is a new development in the art, since the filtering removes the water with the pulp. But there is another aspect of this water removal problem. If the user leaves the current turned on after he has stopped feeding fat through the machine, temperatures may be produced which will produce water vapor from the residual pulp in various parts of the machine, particularly in the hopper. Under such circumstances, there may be considerable condensation on the inside of the lid which ultimately drops down into the filter. This does not occur, however, until after the filter fabric has been saturated with grease so that the filter is not permeable to this water and the water remains as liquid along with the pulp in the scrap chamber, 20, Fig. 1. It is actually possible to pour a large quantity of water into the hopper without any of it appearing in the product.

So far as concerns these functions, it will be obvious that the particular form of filter which is shown in the drawings can be varied within wide limits. I have used filters consisting of many kinds of fabrics,—cotton wools, felts, finely woven wire cloth, fabrics combined with granular material such as chalk, charcoal, fuller's earth and "filter cel". I have also used filters in which pressure is developed and in which surfaces are continuously cleaned by scrapers; also filters which are removable through the bottom of the machine and also ones which attach to the outside of the machine, as well as filters resting on top of the discharge receiver 25. Consequently, I should not be limited to filters of any particular type, nor to any particular number of filtering operations. For instance: in the type of filter shown in the present drawings, it was customary to make three outside screens of very coarse mesh cloth, while the final filter was comparatively fine mesh cloth. Similarly, the filter may take a great many geometrical forms of which I have reduced to practice a considerable number.

The peculiar non-positive film feeding with its abrasive action and tendency to rolling may be found useful in connection with materials other than fats, and the structure combining such action with discharge of the product into a conveniently arranged easily accessible filter may also be useful in other relations.

I claim:

1. Apparatus of the class described, including an upright hollow member formed with an upper hopper portion having a hinged cover, and with a rendering portion into which the hopper discharges, means for heating said rendering portion, filtering means beneath said rendering portion, a vertical drive shaft carrying a rotor concentric with and positioned in the rendering portion and also carrying stirring means in the hopper portion, and provided at the upper end with a detachable coupling member, in combination with means for driving said shaft, including a stud shaft journalled in the hinged cover of the hopper, provided at its lower end with a cooperating detachable coupling member and carrying a friction wheel having an upwardly presented friction surface, a friction pulley with the under face of which said surface engages when the cover is closed; and means for driving said pulley.

2. Apparatus of the class described, including a hollow upright member formed with an upper portion constituting a hopper and with a lower discharge portion into which the hopper discharges, an intermediate portion between the hopper portion and the discharge portion, containing a downward passage for a thin layer of material, means for heating walls of said passage, means for forcing material therethrough in abrasive slip contact with said heated walls, and filtering means receiving the material from said passage.

3. Apparatus of the class described, including a hollow upright member formed with an enlarged upper portion constituting a hopper and with a lower discharge portion into which the hopper discharges, a restricted intermediate portion between the hopper portion and the discharge portion, an electric heater surrounding said restricted portion and means mounted in said restricted portion and slightly spaced from the walls thereof, for feeding material from the hopper through the space between itself and the walls of the restricted intermediate portion into the discharge portion.

4. Apparatus of the class described, including a hollow upright member formed with an upper portion constituting a hopper and with a lower discharge portion into which the hopper discharges, an intermediate portion containing a downward passage for material from the hopper, means for feeding a thin layer of material from the hopper through the said downward passage in slip contact with the walls thereof and means disposed exteriorly of the hollow upright member for regulated heating of the walls thereof adjacent the feeding means.

5. Apparatus of the class described, including a hollow upright member formed with an upper hopper portion, a restricted intermediate portion and a lower enlarged portion, a rotor mounted in the restricted intermediate portion and spaced from the walls thereof and provided with means for feeding material from said hopper to said lower portion through the restricted annular space between itself and the adjacent walls, agitating means in the hopper, regulated heating means disposed exteriorly of the hopper portion and regulated heating means disposed exteriorly of the said restricted intermediate portion, and filtering means receiving material from said restricted annular space.

6. A rendering machine of the class described, including a hollow upright member having an upper hopper portion and a reduced portion therebelow, rotating means for impelling material outwardly in the hopper a rotor in said reduced portion spaced from the walls thereof to provide an annular passage for material from the hopper, said rotor being provided with means impelling material from the hopper through said passageway, and means for heating said material as it passes through said annular passage.

7. A device of the class described, including an upright hollow member, a rotor within said member and a cover for the upper end of said member, in combination with a rotary driving member associated with said cover, and a rotor shaft and clutch members for connecting the driving member and the shaft, said parts being formed and arranged so that said driving member and also said clutch members are automatically disconnected from the rotor shaft by lifting the cover.

8. A device of the class described in claim 7, wherein the clutch includes a pair of radial arms on the rotor shaft engaged by a pair of rotating dogs.

9. Apparatus of the class described, including an upright hollow member formed with a hopper portion at its upper end, a restricted intermediate portion and a lower discharge portion means for heating said restricted intermediate portion, a filter frame work disposed centrally of the discharge portion, a plurality of filter screens supported by the frame work and means including a rotor supported on the filter frame work in the restricted intermediate portion for feeding material from the hopper into the discharge portion exteriorly of the filter, said filter frame work having a boss at one end adapted to provide a bearing for the rotor shaft and means for detachably supporting the plurality of filter screens.

10. Apparatus of the class described, including an upright hollow member formed with a hopper portion at its upper end, a restricted intermediate portion and a lower discharge portion, a filter frame work disposed centrally of the discharge portion, a plurality of filter screens supported by the frame work, means including a rotor supported on the filter frame work in the restricted intermediate portion for feeding material from the hopper into the discharge portion exteriorly of the filter, said filter frame work having a boss at one end adapted to provide a bearing for the rotor shaft and means for detachably supporting the plurality of filter screens, said rotor, filter screens and filter frame work being bodily removable through the top of the hollow member, said filter frame work including supporting feet adapted to support the same in inverted position to facilitate the assembly and replacement of the filters.

11. A machine of the class described, including a hollow upright member having an upper hopper portion, a restricted intermediate portion and a lower discharge portion, a rotor in the restricted intermediate portion for passing material downwardly to the discharge portion, a driving shaft for the rotor, a driving rotor, a cover for the hopper, means carried by said cover for connecting the driving rotor with the shaft of the first mentioned rotor and means whereby opening of said cover automatically disconnects said means from both the rotors.

12. Apparatus of the class described, including a hollow upright member formed with an upper portion constituting a hopper and with a lower discharge portion into which the hopper discharges, an intermediate constricted portion between the hopper portion and the discharge portion containing a downward annular passage for a thin layer of material, means for heating the walls of said annular passage, and means for forcing material through said annular passage in abrasive slip contact with said heated walls.

13. Apparatus of the class described, including a hollow upright member formed with an upper portion constituting a hopper and with a lower discharge portion into which the hopper discharges, an intermediate constricted portion between the hopper portion and the discharge portion, containing a relatively narrow annular passage for a thin layer of material, means for heating the walls of said annular passage and means including a rotor for forcing material through said annular passage in abrasive slip contact with said heated walls.

14. Apparatus of the class described, including a hollow upright member formed with an upper portion constituting a hopper and with a lower discharge portion into which the hopper discharges, a constricted intermediate portion between the hopper portion and the discharge portion, a material feeding rotor mounted in said constricted portion and slightly spaced from the walls thereof to provide a downward passage for a thin layer of material, and means for heating the walls of said passage.

Signed at New York, in the county of New York, and State of New York, this 19th day of November, A. D. 1924.

WILFRED T. BIRDSALL.